(12) United States Patent
Yamamoto (10) Patent No.: US 11,605,280 B2
(45) Date of Patent: Mar. 14, 2023

(54) LOCATION IDENTIFICATION SYSTEM AND LOCATION IDENTIFICATION METHOD

(71) Applicant: OTTA INC., Fukuoka (JP)

(72) Inventor: Fumikazu Yamamoto, Fukuoka (JP)

(73) Assignee: OTTA INC., Fukuoka (JP)

( * ) Notice: Subject to any disclaimer, the term of this patent is extended or adjusted under 35 U.S.C. 154(b) by 0 days.

(21) Appl. No.: 17/635,182

(22) PCT Filed: Aug. 14, 2020

(86) PCT No.: PCT/JP2020/030897
§ 371 (c)(1),
(2) Date: Feb. 14, 2022

(87) PCT Pub. No.: WO2021/039443
PCT Pub. Date: Mar. 4, 2021

(65) Prior Publication Data
US 2022/0292946 A1 Sep. 15, 2022

(30) Foreign Application Priority Data
Aug. 30, 2019 (JP) .............................. JP2019-158510

(51) Int. Cl.
*G08B 21/02* (2006.01)
*H04W 4/029* (2018.01)

(52) U.S. Cl.
CPC ........ *G08B 21/0269* (2013.01); *H04W 4/029* (2018.02); *G08B 21/023* (2013.01)

(58) Field of Classification Search
None
See application file for complete search history.

(56) References Cited

U.S. PATENT DOCUMENTS 9,954,803 B1 * 4/2018 Kominar ................. H04L 51/10
10,187,745 B1 1/2019 Zhao
(Continued)

FOREIGN PATENT DOCUMENTS

EP 3142090 A1 3/2017
JP 5891468 B1 3/2016
(Continued)

OTHER PUBLICATIONS

Examination report of corresponding application IN 202247009299; dated Mar. 21, 2022; 6 pages.

*Primary Examiner* — Santiago Garcia
(74) *Attorney, Agent, or Firm* — Young Basile Hanlon & MacFarlane, P.C.

(57) ABSTRACT

A position specifying system can accurately detect, while reducing a power consumption amount of a carried terminal, a position within a watching area where the target person acts every day and can efficiently detect the position even in an emergency where the target person moves out of the watching area. The terminal transmits, at a first time interval, identification information via short-range wireless communication; acquires, at a second time interval, position information with a GPS function; and transmits the identification information and the position information to a server via long-range wireless communication. A terminal for detection transmits the identification information transmitted from the communicable target person terminal. The server specifies the position of the target person terminal based on information transmitted from the terminal for detection and specifies the position of the target person terminal based on the identification information and the position information transmitted from the target person terminal.

25 Claims, 4 Drawing Sheets

(56) References Cited

U.S. PATENT DOCUMENTS

| | | | | |
|---|---|---|---|---|
| 2009/0031258 A1* | 1/2009 | Arrasvuori | ............ | H04B 1/3833 345/158 |
| 2014/0128031 A1* | 5/2014 | Park | ..................... | H04W 12/50 455/411 |
| 2015/0106312 A1* | 4/2015 | Chen | ..................... | H04W 4/029 706/21 |
| 2016/0381510 A1* | 12/2016 | Reynolds | ................ | H04B 17/27 455/456.1 |
| 2018/0017437 A1* | 1/2018 | Poutiatine | ............. | G01J 1/0228 |
| 2018/0139518 A1* | 5/2018 | Touma | .................... | A63B 43/00 |
| 2019/0016384 A1* | 1/2019 | Carlson | ................ | G05D 1/0088 |
| 2020/0336872 A1* | 10/2020 | Basu Mallick | ... | H04W 72/0406 |
| 2020/0402288 A1* | 12/2020 | Yerli | ..................... | H04W 4/029 |

FOREIGN PATENT DOCUMENTS

| | | |
|---|---|---|
| JP | 2016-212035 A | 12/2016 |
| JP | 2018-031635 A | 3/2018 |
| JP | 2020-153739 A | 9/2020 |
| KR | 20140058996 A | 5/2014 |

\* cited by examiner

LOCATION IDENTIFICATION SYSTEM AND LOCATION IDENTIFICATION METHOD

TECHNICAL FIELD

The present invention relates to a position specifying system and a position specifying method for grasping whereabouts of a target person of watching such as a child.

BACKGROUND

For example, a guardian having a young child often worries whether the child has safely arrived at a school or a cram school without being involved in an accident and, when the child is returning home, worries whether the child will safely arrive at home. Accordingly, local residents and the like have being making various efforts to secure safety of children, for example, watch school routes in cooperation with one another. However, sufficient watching is difficult because of changes in social environments such as an increase in dual income families and aging. Under such circumstances, cases of children being taken away on their way to and from schools and being involved in incidents never cease or rather tend to increase.

As a mechanism for coping with such problems described above, for example, a service for enabling confirmation of position information of children using a GPS function mounted on a portable information terminal such as a smartphone has been provided.

However, a terminal price, a communication charge, and the like of the portable information terminal such as the smartphone are generally high. Further, limitation of use of the portable information terminal due to educational reasons and the like is considered necessary. Therefore, it is unrealistic to give the portable information terminal to every child for the purpose of confirming position information.

Position detection by the GPS function has a problem in that accuracy of a detected position is not sufficiently high. For example, a problem occurs in that, although a child is actually present in a school, the child is detected as being present on a road or the like outside the school and a guardian or the like confirming the position of the child gets worried or feels discomfort.

Further, since the GPS function consumes large power, when positions are always detected using the GPS function, the guardian or the like needs to charge the smartphone or the like at least every few days. Then, for example, when the guardian or the like forgets to charge the smartphone or the like, the guardian or the like cannot confirm the position of the child in case of emergency.

In order to cope with such problems, there has also been proposed a technique for using power-saving short-range wireless communication such as Bluetooth without using the GPS function. For example, a simple Bluetooth terminal that transmits only identification information is carried by a child. The identification information transmitted from the Bluetooth terminal is read by a reading terminal located in a watching area such as a school route. Consequently, it is possible to confirm that the child has passed the position of the reading terminal (see, for example, Japanese Patent No. 5891468).

With such a method, since the short-range wireless communication is used, accuracy of position detection is high. Since the GPS function is not used, the guardian does not need to frequently charge the terminal that the guardian causes the child to carry.

SUMMARY

However, with the technique for using the short-range wireless communication explained above, the position of the child cannot be detected outside the watching area where the reading terminal is provided in advance. Accordingly, when the child moves out of the watching area, the guardian cannot confirm the position of the child and is still uneasy. Actually, when the child disappears outside the watching area, there is also a problem in that there is no clue for searching for the child and it is difficult to find the child.

The present invention has been made in view of the circumstances described above. That is, an object of the present invention is to provide a position specifying system and a position specifying method that can accurately detect, while reducing a power consumption amount of a terminal carried by a target person, a position within a watching area where the target person acts every day and can surely and efficiently detect the position of the target person even in an emergency case where the target person moves out of the watching area.

The object is achieved by the following means.

A position specifying system includes: a target person terminal carried by a target person; a terminal for detection that is present in a region including a preset watching area for the target person and detects the target person terminal communicable via short-range wireless communication; and a server that registers information transmitted from the target person terminal and the terminal for detection. The target person terminal includes a first communication unit and a second communication unit. The first communication unit outputs, at a first time interval, a signal for performing the short-range wireless communication and transmits, via the short-range wireless communication, identification information for identifying the target person terminal. The second communication unit acquires, at a second time interval at least longer than the first time interval, position information of the target person terminal based on a signal from a GPS satellite and transmits the identification information and the position information to the server via long-range wireless communication longer in a communication distance than the short-range wireless communication. The terminal for detection includes a detecting unit and a transmitting unit. The detecting unit detects the communicable target person terminal. When the target person terminal is detected by the detecting unit, the transmitting unit acquires the identification information transmitted from the first communication unit and transmits the identification information to the server. The server includes an acquiring unit, a first specifying unit, and a second specifying unit. The acquiring unit acquires the identification information transmitted from the terminal for detection and information concerning a position of the terminal for detection. The first specifying unit specifies a position of the target person terminal based on the identification information and the information concerning the position of the terminal for detection acquired by the acquiring unit. The second specifying unit specifies the position of the target person terminal based on the identification information and the position information transmitted from the second communication unit of the target person terminal.

A position specifying method is executed in a system including a target person terminal carried by a target person, a terminal for detection that is present in a region including a preset watching area for the target person and detects the target person terminal communicable via short-range wireless communication, and a server that registers information transmitted from the target person terminal and the terminal for detection, the position specifying method including a procedure (a) to a procedure (g). The procedure (a) is for, by the target person terminal, outputting, at a first time interval, a signal for performing the short-range wireless communication and transmitting, via the short-range wireless communication, identification information for identifying the target person terminal. The procedure (b) is for, by the target person terminal, acquiring, at a second time interval at least longer than the first time interval, position information of the target person terminal based on a signal from a GPS satellite and transmitting the identification information and the position information to the server via long-range wireless communication longer in a communication distance than the short-range wireless communication. The procedure (c) is for, by the terminal for detection, detecting the communicable target person terminal. The procedure (d) is for, when the target person terminal is detected in the procedure (c), by the terminal for detection, acquiring the identification information transmitted in the procedure (a) and transmitting the identification information to the server. The procedure (e) is for, by the server, acquiring the identification information transmitted from the terminal for detection and information concerning a position of the terminal for detection. The procedure (f) is for, by the server, specifying a position of the target person terminal based on the identification information and the information concerning the position of the terminal for detection acquired in the procedure (e). The procedure (g) is for specifying the position of the target person terminal based on the identification information and the position information transmitted from the target person terminal.

With the position specifying system of the present invention, the target person terminal transmits, at the first time interval, via the short-range wireless communication, the identification information for identifying the target person terminal, acquires, at the second time interval at least longer than the first time interval, the position information of the target person terminal based on the signal from the GPS satellite, and transmits the identification information and the position information to the server via the long-range wireless communication longer in the communication distance than the short-range wireless communication. The terminal for detection detects the communicable target person terminal and, when the target person terminal is detected, acquires the identification information transmitted from the target person terminal and transmits the identification information to the server. The server acquires the identification information transmitted from the terminal for detection and the information concerning the position of the terminal for detection, specifies, based on the acquired identification information and the acquired information concerning the position of the terminal for detection, the position of the target person terminal corresponding to the identification information, and specifies the position of the target person terminal based on the identification information and the position information transmitted from the target person terminal.

Consequently, since the target person terminal uses the GPS function at an appropriate frequency at an emergency time when the target person terminal is absent within the watching area while executing specifying the position of the target person terminal in a power saving and highly accurate scheme using the short-range wireless communication by the terminal for detection at a normal time when the target person terminal is present within the watching area, it is possible to surely and efficiently specify the position of the target person terminal. Therefore, by making use of merits of the GPS function at appropriate timing according to necessity while eliminating two demerits of battery exhaustion due to power consumption and position specifying accuracy, which are significant problems of position specifying by the GPS function, it is possible to always stably and efficiently confirm the positions of target persons such as children and aged people and secure safety of the target persons and peace of mind of guardians.

DETAILED DESCRIPTION

An embodiment of the present invention is explained below with reference to the accompanying drawings. Note that, in explanation of the drawings, the same elements are denoted by the same reference numerals and signs and redundant explanation is omitted. Dimension ratios of the drawings are exaggerated for convenience of explanation and are sometime different from actual ratios.

<Configuration of a Position Specifying System>

Figure 1:
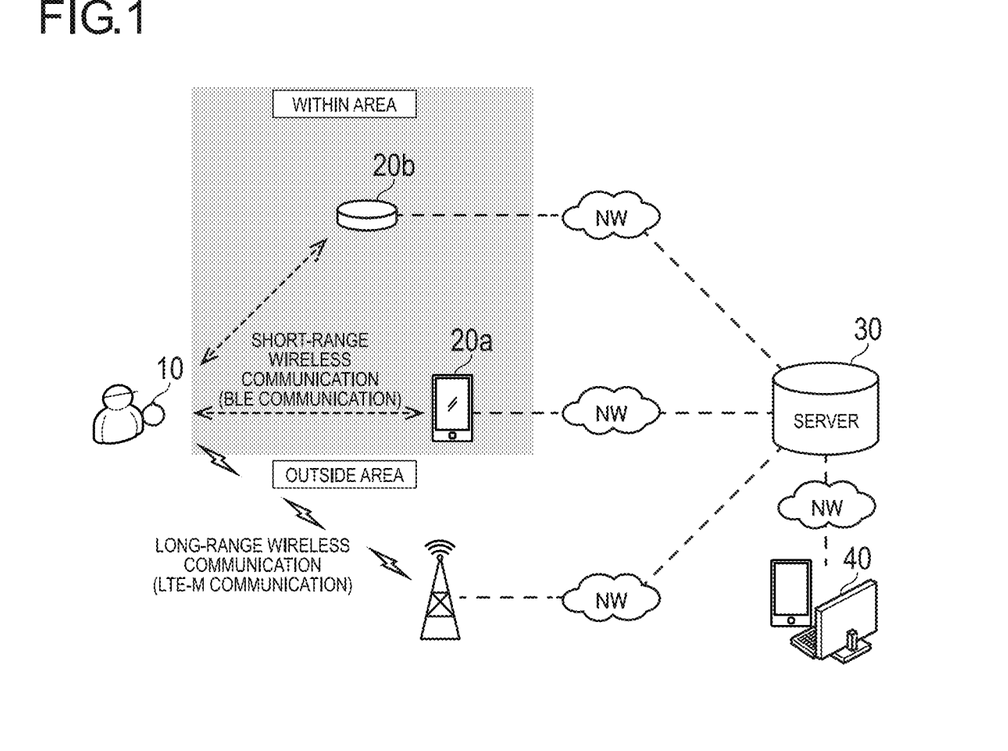
FIG. 1 is a diagram illustrating a schematic configuration of a position specifying system according to an embodiment of the present invention.

FIG. 1 is a diagram illustrating a schematic configuration of a position specifying system according to the embodiment of the present invention.

As illustrated in FIG. 1, the position specifying system is configured from a target person terminal 10, terminals for detection 20 (20a, 20b), a server 30, and a guardian terminal 40. In the following explanation, when the terminal for detection 20a and the terminal for detection 20b are not particularly distinguished, the terminal for detection 20a and the terminal for detection 20b are collectively referred to as terminal for detection 20.

The target person terminal 10 communicates with the terminal for detection 20 (20a, 20b) via short-range wireless communication and is connected to the server 30 through a network via long-range wireless communication.

The terminal for detection 20 (20a, 20b) communicates with the target person terminal 10 via the short-range wireless communication and are connected to the server 30 through networks via wired or wireless communication.

The server 30 is configured to be capable of communicating with the target person terminal 10, the terminal for detection 20 (20a, 20b), and the guardian terminal 40 through networks.

The guardian terminal 40 is connected to the server 30 through the network via wired or wireless communication. The components are explained in detail below.

<Target Person Terminal 10>

The target person terminal 10 is a terminal carried by a target person of watching such as a child or an aged person (hereinafter simply referred to as "target person" as well).

Figure 2:
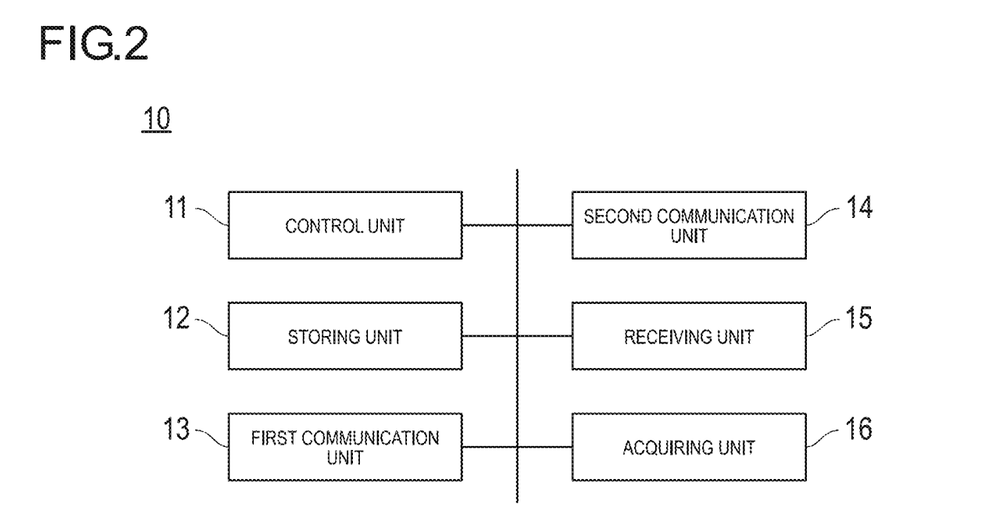
FIG. 2 is a block diagram illustrating a schematic configuration of a target person terminal.

FIG. 2 is a block diagram illustrating a schematic configuration of the target person terminal.

As illustrated in FIG. 2, the target person terminal 10 includes a control unit 11, a storing unit 12, a first communication unit 13, a second communication unit 14, a receiving unit 15, and an acquiring unit 16. The components are communicably connected to one another via a bus.

The control unit 11 includes a CPU (Central Processing Unit) and executes control of the components described above and various kinds of arithmetic processing according to programs.

The storing unit 12 includes a ROM (Read Only Memory) that stores various programs and various data in advance and a RAM (Radom Access Memory) that functions as a work region and temporarily stores programs and data. The storing unit 12 stores the various programs and the various data.

The storing unit 12 stores identification information for identifying the target person terminal 10, information indicating a first time interval, which is a time interval at which the first communication unit 13 transmits the identification information, and a second time interval, which is a time interval at which the second communication unit 14 performs communication, and the like.

The first communication unit 13 outputs, for example, a signal for performing short-range wireless communication using a Bluetooth (registered trademark) standard and communicates with other terminals, devices, and the like present in the proximity via the short-range wireless communication. As a standard of the short-range wireless communication, for example, Bluetooth 4.0 (referred to as Bluetooth Low Energy or BLE as well) is used. Since this standard achieves remarkable power saving instead of pursuing communication speed, the standard is suitably used in this embodiment. The first communication unit 13 performs the short-range wireless communication at the first time interval, which is a relatively short time interval of, for example, approximately several ten milliseconds to several seconds, and transmits identification information for identifying the target person terminal 10 to the periphery. The first time interval can be set to, for example, approximately three seconds.

The second communication unit 14 communicates with other terminals, devices, and the like via long-range wireless communication provided by a mobile communication carrier or the like. As a standard of the long-range wireless communication, for example, LTE-M (Long Term Evolution for Machine-type-communication) is used. Since this standard is one of LPWAs (Low Power Wide Areas: wireless communication techniques for enabling power saving and wide area communication) utilizing existing LTE equipment and achieves power saving and improvement of stability of communication while securing medium communication speed, the standard is suitably used in this embodiment. In this embodiment, the second communication unit 14 transmits identification information for identifying the target person terminal 10 to the server 30 at the second time interval, which is a relatively long time interval of, for example, approximately several minutes to several hours. The second time interval can be optionally set by a user. The user may select and set the second time interval out of selection candidates such as five minutes, ten minutes, thirty minutes, one hour, two hours, and twelve hours. The second time interval may be set such that different values are respectively used when the target person terminal 10 is moving and when the target person terminal 10 is standing still. For example, the second time interval at a moving time when the target person terminal 10 is moving may be set to thirty minutes and the second time interval at a standstill time when the target person terminal 10 is standing still may be set to one hour. Here, it can be determined based on, for example, detection information of an acceleration sensor (not illustrated) provided in the target person terminal 10, whether the target person terminal 10 is moving or is standing still. Further, as the second time interval, different values may be set according to stages of moving speed of the target person terminal 10. For example, different values may be set such that different values are respectively used according to stages of moving speed, for example, when the moving speed of the target person terminal 10 is low speed (0 km/h to 4 km/h), medium speed (4 km/h to 10 km/h), and high speed (10 km/h or higher). The stages of the moving speed are not limited to the example described above. Various numbers of stages and states in various ranges can be set.

The second communication unit 14 has a GPS function for receiving a signal from a GPS satellite and acquiring position information based on the received signal. When transmitting the identification information for identifying the target person terminal 10 to the server 30 as explained above, the second communication unit 14 starts the GPS function, acquires position information, and transmits the acquired position information to the server 30 together with the identification information. In this way, in addition to using the long-range wireless communication technique in which power saving is achieved, the second communication unit 14 performs the long-range wireless communication and the position information acquisition by the GPS function at the relatively long time interval of approximately one hour. Therefore, further power saving is realized.

The receiving unit 15 is a component for receiving an instruction for notifying occurrence of some emergency situation from the target person or the like and is configured by, for example, a push button. Note that the receiving unit 15 may receive the instruction via voice acquired by a microphone or the like or may receive the instruction via an image (including a video) acquired by a camera or the like. When the instruction is received by the receiving unit 15, the control unit 11 controls the second communication unit 14, acquires position information with the GPS function, and transmits a notification indicating the occurrence of the emergency situation to the server 30 together with the identification information and the position information of the target person terminal 10.

The acquiring unit 16 is a component for acquiring voice and an image (a video) around the target person terminal 10 and is configured by a microphone, a camera, and the like. The acquiring unit 16 functions as a recording unit in this embodiment. For example, when the instruction for notifying the occurrence of the emergency situation is received in the receiving unit 15, the acquiring unit 16 acquires voice or an image (a video) around the target person terminal 10. The control unit 11 stores information indicating the voice or the image (the video) acquired by the acquiring unit 16 in the storing unit 12 and transmits the information to the server 30 via the second communication unit 14.

The target person terminal 10 in this embodiment achieves power saving as explained above concerning wireless communication usually having large power consumption. Therefore, for example, when a small secondary battery such as a rechargeable lithium ion battery is used, the target person terminal 10 is capable of operating even if the target person terminal 10 is not charged for approximately one month. Depending on setting content or a state of use, it is also possible to cause the target person terminal 10 to operate for approximately several months to one year without charging.

<Terminal for Detection 20 (20a, 20b)>

The terminal for detection 20 is a terminal that is present in a region including a watching area for the target person and detects the target person terminal 10 communicable via the short-range wireless communication. The terminal for detection 20a is a fixed terminal provided in a predetermined position included in the watching area. The terminal for detection 20b is a mobile terminal provided in a person, a car, or the like, which is a mobile body moving in a region including the watching area. The car includes various vehicles such as a private automobile, a taxi, a bus, and a train. For example, the terminal for detection 20 may be configured by installing a dedicated application in a general-purpose information terminal such as a smartphone or a tablet PC or may be configured as a dedicated terminal including minimum components explained below.

Figure 3:
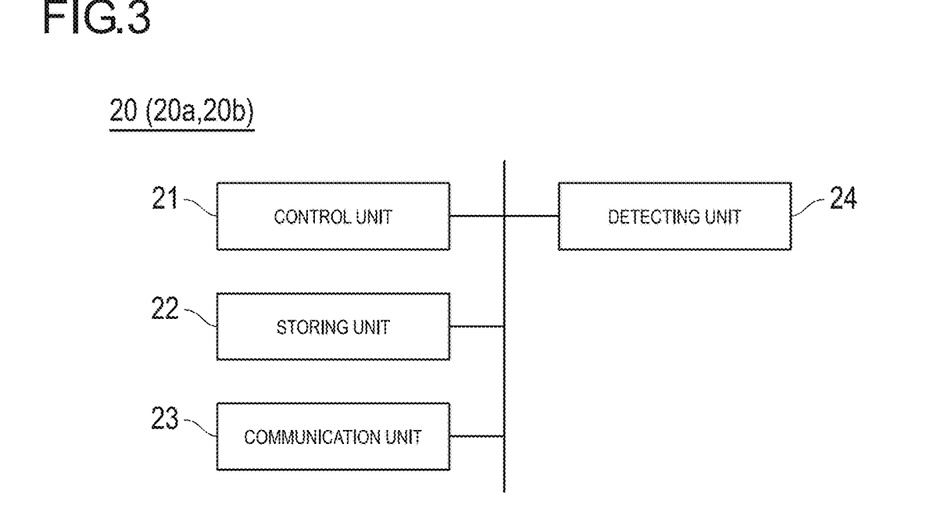
FIG. 3 is a block diagram illustrating a schematic configuration of a terminal for detection.

FIG. 3 is a block diagram illustrating a schematic configuration of the terminal for detection.

As illustrated in FIG. 3, the terminal for detection 20 includes a control unit 21, a storing unit 22, a communication unit 23, and a detecting unit 24. The components are communicably connected to one another via a bus. The control unit 21 and the storing unit 22 of the terminal for detection 20 are respectively the same components as the control unit 11 and the storing unit 12 of the target person terminal 10. Therefore, explanation of the control unit 21 and the storing unit 22 is omitted.

The communication unit 23 is a component for communicating with other terminals, devices, and the like via a network. For example, the communication unit 23 transmits and receives various kinds of information to and from the server 30.

The detecting unit 24 is a component for detecting the target person terminal 10 communicable via the short-range wireless communication such as Bluetooth explained above. As explained above, the target person terminal 10 performs the communication via the short-range wireless communication through the first communication unit 13. For example, when receiving the identification information transmitted by the first communication unit 13 of the target person terminal 10, the detecting unit 24 can detect the target person terminal 10 as the communicable target person terminal 10.

When the target person terminal 10 is detected by the detecting unit 24, the control unit 21 functions as a transmitting unit and transmits identification information of the target person terminal 10 to the server 30.

Since the terminal for detection 20a is the fixed terminal, information concerning the position of each terminal for detection 20a is associated with information for identifying the terminal for detection 20a and stored in a storing unit 32 of the server 30 in advance. When transmitting the identification information of the target person terminal 10 detected by the detecting unit 24 to the server 30, the terminal for detection 20a transmits the information for identifying the terminal for detection 20a to the server 30 together with the identification information. Consequently, when receiving the identification information of the target person terminal 10 from the terminal for detection 20a, the server 30 can acquire the information concerning the position of the target person terminal 20a from the storing unit 32 using the information for identifying the terminal for detection 20a received together with the identification information.

On the other hand, since the terminal for detection 20b is the mobile terminal, information concerning the position of each terminal for detection 20b is acquired based on a signal from the GPS satellite with the GPS function of each terminal for detection 20b. When transmitting the identification information of the target person terminal 10 detected by the detecting unit 24 to the server 30, the terminal for detection 20b transmits information indicating the position of the terminal for detection 20b together with the identification information. Consequently, when receiving the identification information of the target person terminal 10 from the terminal for detection 20b, the server 30 can acquire the information indicating the position of the terminal for detection 20b based on the information received together with the identification information.

For example, when the terminal for detection 20b, which is the mobile terminal, is configured by a smartphone, a tablet PC, or the like, the terminal for detection 20b further includes components of a general information terminal such as an operation unit and a display unit (e.g., a touch panel display). In this case, the terminal for detection 20 can be used as a guardian terminal 40 explained below as well.

<Server 30>

The server 30 is, for example, an information processing device operated by a provider of a service for specifying and notifying position information.

Figure 4:
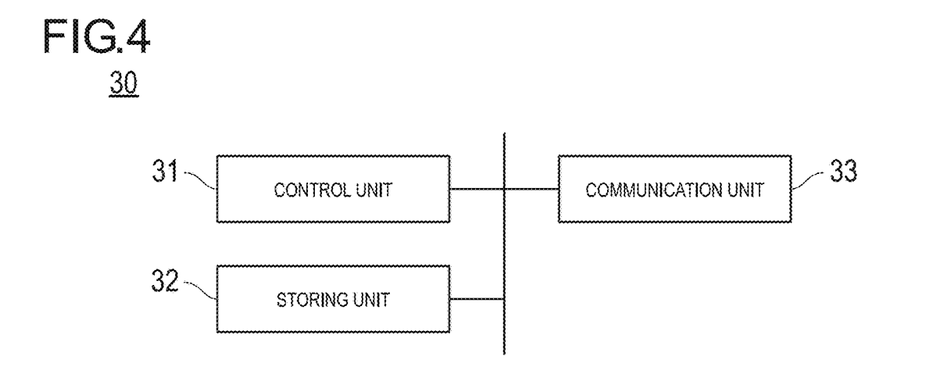
FIG. 4 is a block diagram illustrating a schematic configuration of a server.

FIG. 4 is a block diagram illustrating a schematic configuration of the server.

As illustrated in FIG. 4, the server 30 includes a control unit 31, a storing unit 32, and a communication unit 33. The components are communicably connected to one another via a bus. Since the configurations of the control unit 31, the storing unit 32, and the communication unit 33 of the server 30 are the same as the configurations of the control unit 21, the storing unit 22, and the communication unit 23 of the terminal for detection 20, explanation of the configurations is omitted.

The control unit 31 reads a program and executes processing to thereby function as an acquiring unit, a first specifying unit, and a second specifying unit. The control unit 31 functions as the acquiring unit and acquires identification information transmitted from the terminal for detection 20 and information concerning the position of the terminal for detection 20. The control unit 31 functions as the first specifying unit and specifies the position of the target person terminal 10 based on the identification information and the information concerning the position of the terminal for detection 20 acquired by the acquiring unit. The control unit 31 functions as the second specifying unit and specifies the position of the target person terminal 10 based on identification information and position information transmitted from the second communication unit of the target person terminal 10.

The control unit 31 may function as a setting unit, a notifying unit, and an output unit. The control unit 31 functions as the setting unit and sets the second time interval of the target person terminal 10 to be changed based on a specifying state of the position of the target person terminal 10 in the first specifying unit or the second specifying unit. The control unit 31 functions as the notifying unit and notifies a guardian of the target person when the second time interval is set to be changed to be short by the setting unit. The control unit 31 functions as the output unit and outputs information concerning the position of the target person terminal 10 specified by the first specifying unit or the second specifying unit. The control unit 31 may output the information concerning the position according to coordinate information such as two dimensions or three dimensions or may convert the coordinate information into an address, an area name, or the like according to a predetermined rule and output the coordinate information as the address or the area name.

In the storing unit 32, as information concerning the target person and the target person terminal 10, identification information of the target person terminal 10, attribute information such as a name and age of a target person carrying the target person terminal 10, attribute information such as a name and a place to contact of a guardian of the target person, and the like are correlated and stored in the storing unit 32.

In the storing unit 32, as information concerning the terminal for detection 20, identification information of the terminal for detection 20, attribute information indicating whether the terminal for detection 20 is a fixed terminal or a mobile terminal, information concerning the position of the terminal for detection 20 in the case of the fixed terminal, and the like are correlated and stored.

In the storing unit 32, flag information concerning a flag for setting the second time interval of the target person terminal 10, information concerning a range of a watching area for setting the flag, and the like are also stored. The range of the watching area may be defined by a range of coordinate information such as two dimensions or three dimensions or may be defined by an address, an area name, or the like corresponding to the range of the coordinate information. In the storing unit 32, information concerning a predetermined range where, within the watching area, the target person is assumed to easily move out of the watching area, information concerning environments of regions within the watching area, information concerning risks corresponding to the environments, information concerning risks corresponding to time periods in the regions, and the like are also stored. In the storing unit 32, a value of the second time interval set for each target person terminal 10 according to a specifying state, a moving state, and moving speed of the position of the target person terminal 10, an environment of a district where the target person terminal 10 is located, a time period, and the like is also stored.

<Guardian Terminal 40>

Figure 5:
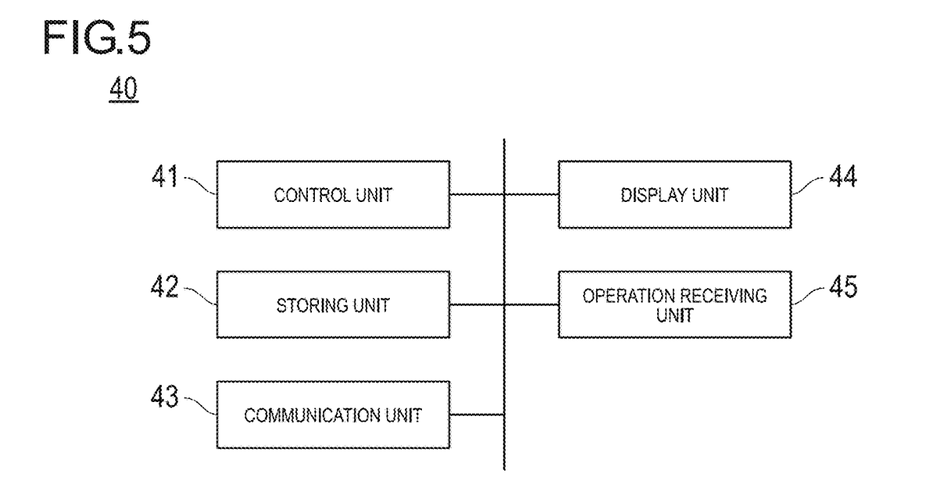
FIG. 5 is a block diagram illustrating a schematic configuration of a guardian terminal.

The guardian terminal 40 is a terminal used by a guardian who protects and manages the target person. The guardian terminal 40 receives a notification from the server 30 and informs the notification to the guardian and accesses the server 30 and acquires and displays information concerning the position of the target person output by the server 30.

FIG. 5 is a block diagram illustrating a schematic configuration of the guardian terminal.

As illustrated in FIG. 5, the guardian terminal 40 includes a control unit 41, a storing unit 42, a communication unit 43, a display unit 44, and an operation receiving unit 45. The components are communicably connected to one another via a bus. Since the configurations of the control unit 41, the storing unit 42, and the communication unit 43 of the guardian terminal 40 are the same as the configurations of the control unit 21, the storing unit 22, and the communication unit 23 of the terminal for detection 20, explanation of the configurations is omitted.

The display unit 44 includes an LCD (liquid crystal display) or an organic EL display and displays various kinds of information. The operation receiving unit 45 includes a touch sensor, a pointing device such as a mouse, and a keyboard and receives various kinds of operation of a user.

The display unit 44 and the operation receiving unit 45 may be configured as a touch panel by superimposing a touch sensor functioning as the operation receiving unit 45 on a display surface functioning as the display unit 44.

Note that each of the target person terminal 10, the terminal for detection 20, the server 30, and the guardian terminal 40 may include components other than the components explained above or may not include a part of the components explained above.

<Processing in the Position Specifying System>

Subsequently, a flow of processing in the position specifying system is explained.

Figure 6:
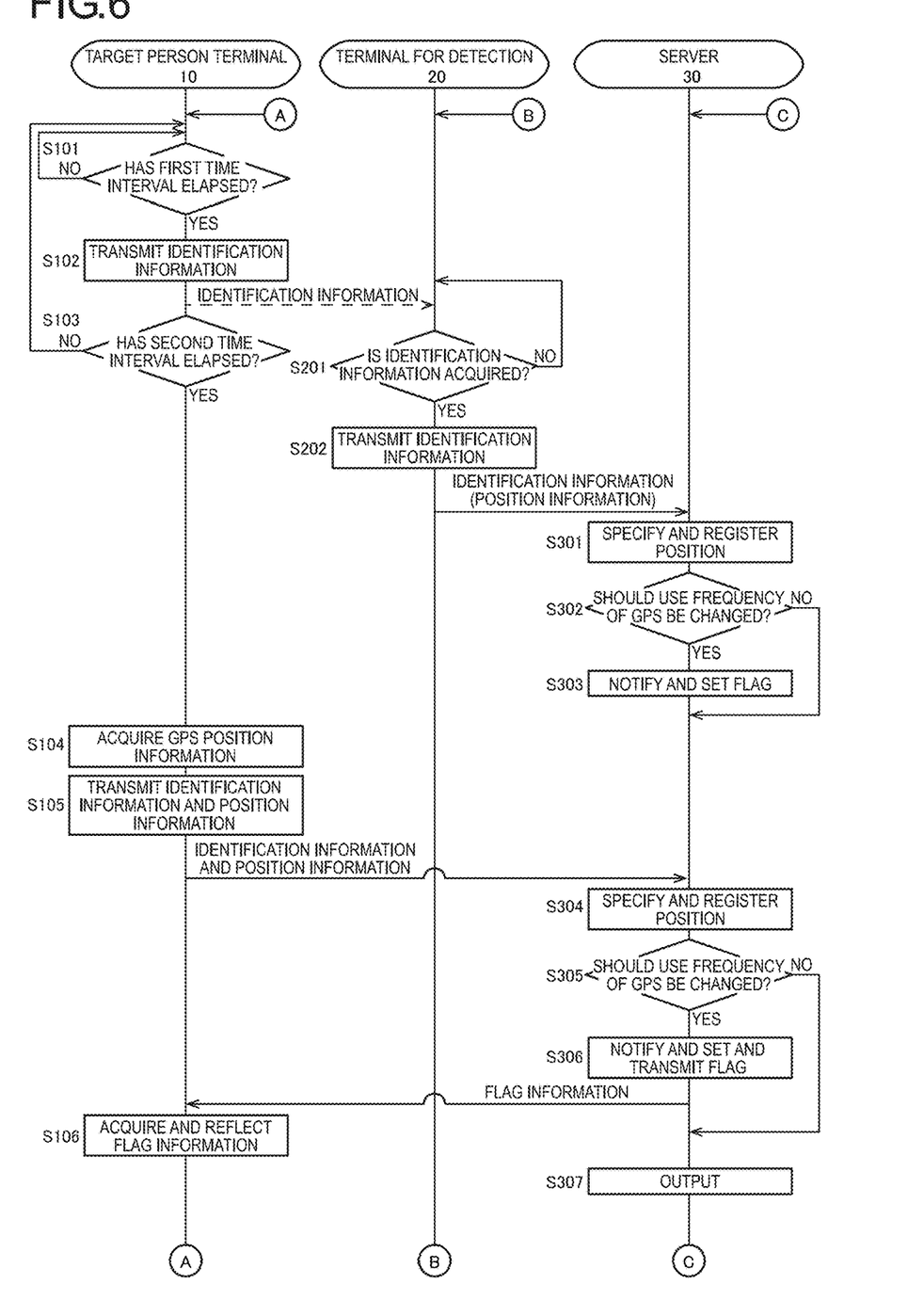
FIG. 6 is a sequence chart illustrating a flow of processing executed in the position specifying system.
Figure 7A:
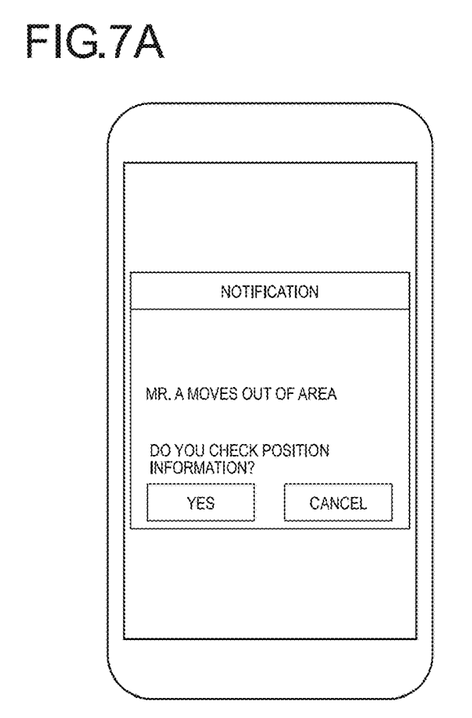
FIG. 7 is a diagram illustrating an example of a screen displayed on the guardian terminal.
Figure 7B:
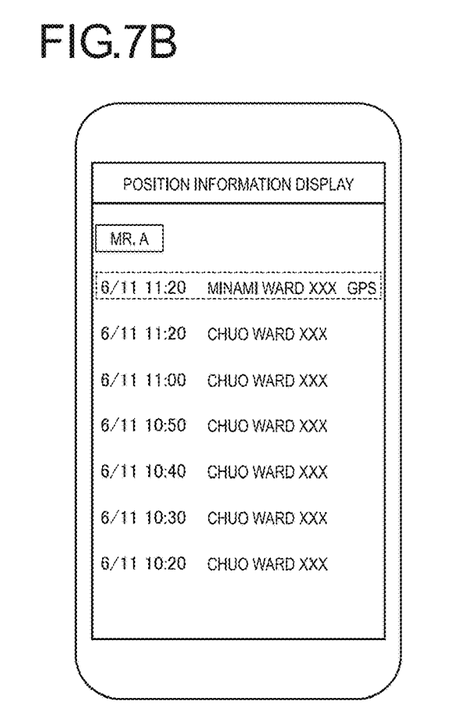
Figure 7C:
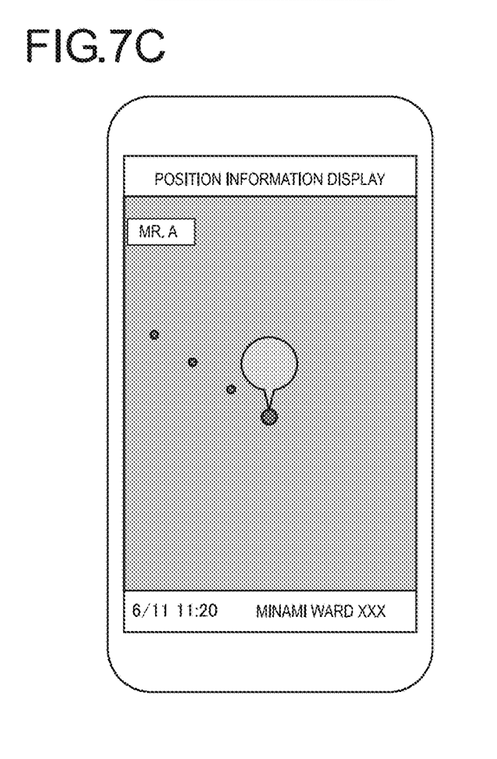

FIG. 6 is a sequence chart illustrating a flow of processing executed in the position specifying system. FIG. 7 is a diagram illustrating an example of a screen displayed on the guardian terminal.

First, processing of the target person terminal 10 is explained.

As illustrated in FIG. 6, the target person terminal 10 determines whether the first time interval has elapsed (step S101). When the first time interval has not elapsed (step S101: NO), the target person terminal 10 stays on standby until the first time interval elapses.

When the first time interval has elapsed (step S101: YES), the target person terminal 10 outputs a signal for performing the short-range wireless communication and transmits identification information for identifying the target person terminal 10 to the periphery via the short-range wireless communication through the first communication unit 13 (step S102). Since a relatively short time interval of approximately three seconds is set as the first time interval, the target person terminal 10 is in a state in which the target person terminal 10 always transmits the identification information at a short cycle. As the first time interval, a constant value may be set as a fixed value or a fluctuating value may be set. Note that the first communication unit 13 may output a radio wave for performing the short-range wireless communication at the first time interval and, when communication is established with a communication destination, transmit the identification information to the communication destination. Alternatively, the first communication unit 13 may transmit the identification information at the first time interval irrespective of whether the communication with the communication destination is established.

Subsequently, the target person terminal 10 determines whether the second time interval has elapsed (step S103). When the second time interval has not elapsed (step S103: NO), the target person terminal 10 returns to the processing in step S101 and repeats the processing for performing the short-range wireless communication.

When the second time interval has elapsed (step S101: YES), the target person terminal 10 acquires, with the second communication unit 14, position information of the target person terminal 10 based on a signal from the GPS satellite using a publicly-known technique (step S104). The target person terminal 10 transmits the position information of the target person terminal 10 acquired in the processing in step S104 and the identification information for identifying the target person terminal 10 to the server 30 via the long-range wireless communication (step S105). Since a relatively long time interval of approximately one hour is set as the second time interval, the target person terminal 10 transmits the identification information and the position information by the GPS function to the server 30 via the long-range wireless communication at a long cycle such as every one hour while transmitting the identification information via the short-range wireless communication at the short cycle as explained above. Note that, when the value corresponding to the moving state and the moving speed of the target person terminal 10 is set as the second time interval as explained above, the target person terminal 10 uses the second time interval corresponding to a moving state and moving speed thereof determined based on detection information of the acceleration sensor or the like.

Subsequently, if the target person terminal 10 acquires flag information for changing the second time interval from the server 30 when the target person terminal 10 performs communication with the server 30 in the processing in step S105, the target person terminal 10 changes the second time interval based on content of the flag information (step S106).

The target person terminal 10 repeatedly executes the processing in step S101 to step S106.

Subsequently, processing of the terminal for detection 20 is explained.

The terminal for detection 20 detects the communicable target person terminal 10 and determines whether identification information is acquired from the target person terminal 10 (step S201). When the identification information is not acquired (step S201: NO), the terminal for detection 20 continues processing for detecting the target person terminal 10 and acquiring the identification information until the identification information is successfully acquired.

When the identification information is acquired (step S201: YES), the terminal for detection 20 transmits the acquired identification information to the server 30 (step S202).

Here, when the terminal for detection 20 is the fixed terminal (the terminal for detection 20a), the terminal for detection 20a transmits information for identifying the terminal for detection 20a to the server 30 together with the identification information. This is because information concerning the position of each terminal for detection 20a is stored in the storing unit 32 of the server 30 in advance in association with the information for identifying the terminal for detection 20a. Consequently, when receiving the identification information of the target person terminal 10 from the terminal for detection 20a, the server 30 can acquire the information concerning the position of the terminal for detection 20a from the storing unit 32 using the information for identifying the terminal for detection 20a received together with the identification information.

On the other hand, when the terminal for detection 20 is the mobile terminal (the terminal for detection 20b), the terminal for detection 20b acquires information concerning the position of each terminal for detection 20b based on a signal from the GPS satellite using the GPS function and transmits the information to the server 30 together with the identification information. Consequently, when receiving the identification information of the target person terminal 10 from the terminal for detection 20b, the server 30 can acquire information indicating the position of the terminal for detection 20b based on the information received together with the identification information.

The terminal for detection 20 repeatedly executes the processing in step S201 to step S202.

Subsequently, processing of the server 30 is explained.

The server 30 receives the identification information of the target person terminal 10 from the terminal for detection 20, acquires the information concerning the position of the terminal for detection 20 as explained above, and specifies a position of the target person terminal 10 corresponding to the identification information based on the acquired information (step S301). The server 30 registers the identification information of the target person terminal 10 and the specified position in the storing unit 32 in correlation with each other.

Subsequently, the server 30 determines, based on a specifying state of the position of the target person terminal 10 in the processing in step S301, whether it is necessary to change a frequency of acquiring position information using the GPS function, that is, the second time interval (step S302).

For example, when the specified position of the target person terminal 10 is included in a predetermined range within a preset watching area, the server 30 determines that it is necessary to change the second time interval of the target person terminal 10 to be short. The predetermined range is, for example, a region of a peripheral edge portion of the watching area where the target person terminal 10 is predicted to move out of the watching area soon or a region including stations and bus stops where the target person can get on and get off means of transportation such as trains and buses capable of moving a long distance or railroads, bus roads, and the like on which the trains and the buses pass.

When it is determined based on transition of the specified position of the target person terminal 10 that the target person terminal 10 is moving from a predetermined range such as the peripheral edge portion within the watching area toward the outer side of the watching area, the server 30 may determine that it is necessary to change the second time interval of the target person terminal 10 to be short. This is because the target person terminal 10 is highly likely to move out of the watching area soon.

The server 30 may determine, based on the specified position of the target person terminal 10, a district including the position, acquire a value of the second time interval preset according to an environment of the district, and, when the acquired value is different from a value used in the target person terminal 10, determine that it is necessary to change the second time interval of the target person terminal 10. As the environment of the district, for example, attributes (a residential area, an office area, a shopping district, an amusement district, or the like) of the district, a public peace level, a traffic volume level, a fulfillment level of watching (a fulfillment degree of the terminals for detection 20a and 20b), an incident/accident occurrence degree, a suspicious person information occurrence degree, and a disaster occurrence degree are set. The second time interval can be set for each target person terminal 10 according to the environment of the district. The attributes of the district can be dynamically changed. For example, when an incident/accident or a disaster occurs, any range can be set as an incident/accident occurrence district or a disaster occurrence district.

The server 30 may determine, based on the specified position of the target person terminal 10, a district including the position, acquire a value of the second time interval preset for the district according to a time period, and, when the acquired value is different from a value used in the target person terminal 10, determine that it is necessary to change the second time interval of the target person terminal 10. For example, the second time interval in a time period of the daytime can be set long and the second time interval in a time period at night can be set short for a district that is relatively safe in the daytime but has high risk at night from the viewpoints of a public peace level, a traffic volume level, a watching fulfillment level, and the like.

When identification information transmitted from the first communication unit 13 of the target person terminal 10 is not acquired for a predetermined time, the server 30 may determine that it is necessary to change the second time interval of the target person terminal 10 corresponding to the identification information to be short.

When the target person terminal 10 moves from a predetermined range within the watching area to a range other than the predetermined range within the watching area, the server 30 may change the second time interval of the target person terminal 10 to be long based on transition of the specified position of the target person terminal 10.

Note that the server 30 may execute a plurality of the various determination methods explained above in combination with one another.

When it is determined that it is unnecessary to change the second time interval (step S302: NO), the server 30 proceeds to processing in step S304 or step S301. When receiving identification information from the terminal for detection 20, the server 30 returns to the processing in step S301. When receiving identification information from the target person terminal 10, the server 30 proceeds to the processing in step S304.

When it is determined that it is necessary to change the second time interval (step S302: YES), the server 30 notifies the guardian terminal 40 correlated with the target person terminal 10 in advance and sets a setting flag for setting the second time interval of the target person terminal 10 to be changed (step S303). When the target person terminal 10 communicates with the server through the second communication unit 14 according to the setting flag, it is possible to acquire the setting flag and change the second time interval based on content of the acquired setting flag.

Here, the notification to the guardian terminal 40 is executed by, for example, causing the display unit 44 of the guardian terminal 40 to display a notification screen illustrated in (a) of FIG. 7. Alternatively, the notification to the guardian terminal 40 may be executed by transmitting a message to an electronic mail address or accounts of various messaging applications, SNS services, or the like registered in advance.

For example, when a "Yes" button is pressed on the screen illustrated in (a) of FIG. 7, the server 30 transmits position information of a relevant target person to the guardian terminal 40 (equivalent to processing in step S307 explained below). Consequently, for example, a position information display screen illustrated in (b) of FIG. 7 is displayed on the display unit 44 of the guardian terminal 40.

On the screen illustrated in (b) of FIG. 7, transition of position information of a target person "Mr. A" is displayed in time series upward from the bottom of the screen. This screen indicates that it is detected from GPS information that Mr. A located in "Chuo ward", which is a watching area, at 9 am to 11 am is located in "Minami ward" outside the watching area at 11:20 am. Further, on the screen illustrated in (b) of FIG. 7, detailed position information including map information may be displayed as illustrated on a screen illustrated in (c) of FIG. 7 by pressing marks of records indicating position information. Note that display order and display contents of the screens are not limited to the example explained above. The position information of the target person can be displayed by various methods. For example, when the "Yes" button is pressed on the screen illustrated in (a) of FIG. 7, the screen illustrated in (c) of FIG. 7 may be displayed. The screen illustrated in (b) of FIG. 7 may be displayed by performing predetermined operation such as pressing of a history button.

The server 30 specifies, based on the identification information and the position information transmitted from the second communication unit 14 of the target person terminal 10, a position of the target person terminal 10 corresponding to the identification information (step S304). The server 30 registers the identification information and the specified position of the target person terminal 10 in the storing unit 32 in correlation with each other.

Subsequently, the server 30 determines, based on a specifying state of the position of the target person terminal 10 in the processing in step S304, whether it is necessary to change the frequency of acquiring position information using the GPS function, that is, the second time interval (step S305).

For example, the server 30 determines, based on the position of the target person terminal 10 specified in the processing in step S304, according to the same method as the processing in step S302 explained above, whether it is necessary to change the second time interval.

When the position of the target person terminal specified in the processing in step S304 is outside the watching area, the server 30 may determine that it is necessary to change the second time interval of the target person terminal 10 to be short.

When it is determined that it is unnecessary to change the second time interval (step S305: NO), the server 30 proceeds to processing in step S307.

When it is determined that it is necessary to change the second time interval (step S305: YES), the server 30 notifies the guardian terminal 40 correlated with the target person terminal 10 in advance, sets a setting flag for setting the second time interval of the target person terminal 10 to be changed, and transmits the setting flag to the target person terminal 10 (step S306). Consequently, the target person terminal 10 can acquire the setting flag explained above and change the second time interval based on content of the acquired setting flag.

Subsequently, the server 30 outputs the information registered in the processing in step S301 and step S304, the information notified in the processing in step S303 and step S306, and the like to be browsable in the guardian terminal 40 (step S307). This output processing can be executed at any timing based on a request or the like from the guardian terminal 40.

Note that, in the sequence chart of FIG. 6, the flow in which the server 30 receives the identification information of the target person terminal 10 through the terminal for detection 20 and, thereafter, directly receives the identification information from the target person terminal 10 is explained. However, actually, the server 30 executes the processing in step S301 when receiving the identification information from the terminal for detection 20 and executes the processing in step S304 when receiving the identification information from the target person terminal 10. In an actual use environment of this system, it is assumed that a plurality of target person terminals 10 and a plurality of terminals for detection 20 are provided. The server 30 executes the processing explained above for each of the plurality of target person terminals 10 and the plurality of terminals for detection 20.

When the receiving unit 15 of the target person terminal 10 receives an instruction for notifying occurrence of an emergency situation, irrespective of the processing flow of the sequence chart in FIG. 6, the target person terminal 10 executes the processing in step S104 and step S105, acquires position information using the GPS function, and transmits a notification indicating the occurrence of the emergency situation including the identification information and the position information to the server 30. In doing so, the target person terminal 10 can acquire voice and an image (a video) around the target person terminal 10 with the acquiring unit 16 and transmit information indicating the voice and the image (the video) to the server 30.

The instruction for notifying the occurrence of the emergency situation is not limited to a form in which the instruction is received by the receiving unit 15 of the target person terminal 10. The instruction may be received in a form in which an emergency flag indicating the occurrence of the emergency situation is set in the server 30. In this case, when the target person terminal 10 performs periodical communication with the server 30 and acquires the emergency flag, the instruction for notifying the occurrence of the emergency situation is received by the target person terminal 10. For example, processing for acquiring position information using the GPS function and transmitting the position information to the server 30 is executed.

Note that the present invention is not limited to the embodiment explained above and can be variously modified within the scope of claims.

In the embodiment explained above, an example is explained in which the server 30 determines a case in which the target person terminal 10 is about to move out of the watching area and sets the setting flag for changing the second time interval. However, the target person terminal 10 may execute the determination and the change of the second time interval. In this case, the target person terminal 10 function as the setting unit.

In the processing in step S104 in FIG. 6, the target person terminal 10 is explained as acquiring the position information using the GPS function when the second time interval has elapsed. However, when it can be determined from the information of the acceleration sensor or the like that the position of the target person terminal 10 has not changed from a position where position information is acquired using the GPS function last time, the use of the GPS function may be omitted and the position information acquired last time may be used as it is. Consequently, it is possible to further reduce power consumption by the GPS function of the target person terminal 10.

In the embodiment explained above, an example is explained in which each component such as the server 30 included in the position specifying system is configured as one independent device. However, the configuration of the device is not limited to this. Each component may be configured from a plurality of devices or may be included in a device having other functions. For example, the server 30 may be configured to be distributed on a Cloud server configured from a large number of servers. Alternatively, an application having the function of the server 30 may be installed in the terminal for detection 20, the guardian terminal 40, or the like and the processing of the server 30 may be executed in the terminal for detection 20 or the guardian terminal 40.

In the embodiment explained above, an example is explained in which the target person terminal 10 is a small dedicated terminal that can be driven by a button battery. However, the target person terminal 10 is not limited to this. The target person terminal 10 may be a smartphone, a tablet terminal, or the like or may be a wearable information terminal, an implantable information terminal, or the like worn on the arm, the head, or the like of the target person. In this case as well, by applying the embodiment explained above, the position of the target person is accurately, surely, and efficiently specified while the power consumption amount is greatly reduced.

The processing of the position specifying system according to the embodiment explained above may include steps other than the steps explained above or may not include a part of the steps explained above. The order of the steps is not limited to the embodiment explained above. Further, each of the steps may be combined with the other steps and executed as one step, may be included in the other steps and executed, or may be divided into a plurality of steps and executed.

Means and methods for performing various kinds of processing in the position specifying system according to the embodiment explained above can be realized by either a dedicated hardware circuit or a programmed computer. For example, the program may be provided by a computer-readable recording medium such as a flexible disk or a CD-ROM or may be provided online via a network such as the Internet. In this case, the program recorded in the computer-readable recording medium is usually transferred to and stored in a storing unit such as a hard disk. The program may be provided as independent application software or may be incorporated in software of a device of the position specifying system as a function of the position specifying system.

The position specifying system in this embodiment configured as explained above includes the target person terminal 10, the terminal for detection 20, and the server 30. The target person terminal 10 outputs, at a first time interval, a signal for performing short-range wireless communication, transmits, via the short-range wireless communication, identification information for identifying the target person terminal 10, acquires, at a second time interval at least longer than the first time interval, position information of the target person terminal 10 based on a signal from a GPS satellite, and transmits the identification information and the position information to the server 30 via long-range wireless communication longer in a communication distance than the short-range wireless communication. The terminal for detection 20 detects the communicable target person terminal 10 and, when the target person terminal 10 is detected, acquires the identification information transmitted from the target person terminal 10 and transmits the identification information to the server 30. The server 30 acquires the identification information transmitted from the terminal for detection 20 and information concerning a position of the terminal for detection 20, functions as a first specifying unit and specifies a position of the target person terminal 10 corresponding to the identification information based on the acquired identification information and the acquired information concerning the position of the terminal for detection 20, and functions as a second specifying unit and specifies the position of the target person terminal 10 based on the identification information and the position information transmitted from the target person terminal 10.

Consequently, by disposing the terminal for detection 20 within a watching area where the target person terminal 10 (that is, a target person) is present every day, it is possible surely execute specifying the position of the target person terminal 10 using a GPS function at an appropriate frequency at an emergency time when the target person terminal 10 is absent within the watching area while executing specifying the position of the target person terminal 10 in a power saving and highly accurate scheme using the short-range wireless communication at a normal time when the target person terminal 10 is present within the watching area. Therefore, by appropriately making use of merits of the GPS function when necessary while eliminating two demerits of battery exhaustion due to power consumption and stability of position accuracy, which are significant problems of position specifying by the GPS function, it is possible to always stably and efficiently confirm the position of the target person such as a child or an aged person and secure safety of the target person and peace of mind of a guardian.

The position specifying system sets the second time interval of the target person terminal 10 to be changed based on a specifying state of the position of the target person terminal 10 in the first specifying unit or the second specifying unit explained above. Consequently, it is possible to adjust an execution frequency of position acquisition by the GPS function according to the specifying state of the position of the target person terminal 10. Therefore, according to the specifying state of the position, it is possible to minimize a use frequency of the GPS function when necessity of using the GPS function is low and increase a frequency of the position acquisition by the GPS function when the necessity of using the GPS function is high. Consequently, it is possible to guarantee certainty of specifying the position of the target person while reducing power consumption and achieving power saving and an increase in the life of the target person terminal 10.

The position specifying system sets the second time interval of the target person terminal 10 to be changed to be short when the position of the target person terminal 10 specified by the first specifying unit or the second specifying unit is included in a predetermined range within the watching area. Consequently, when the target person is present in a specific district such as an end of the watching area, a station, or a bus stop, the frequency of the position acquisition by the GPS function can be increased in advance. Therefore, even when the target person moves out of the watching area, it is possible to incessantly and seamlessly specify the position of the target person.

When it is determined based on the position of the target person terminal 10 specified by the first specifying unit that the target person terminal 10 is moving from a predetermined range within the watching area toward the outer side of the watching area, the position specifying system sets the second time interval of the target person terminal 10 to be changed to be short. Consequently, when the target person is present in the specific district such as the end of the watching area and is moving toward the outside of the area, the frequency of the position acquisition by the GPS function can be increased in advance. Therefore, it is possible to specify the position of the target person while further reducing the power consumption of the target person terminal 10.

When the position of the target person terminal 10 specified by the first specifying unit or the second specifying unit has moved from a predetermined range within the watching area to a range other than the predetermined range within the watching area, the position specifying system sets the second time interval of the target person terminal 10 to be changed to be long. Consequently, when the target person returns from the specific district such as the end of the watching area, the frequency of the position acquisition by the GPS function can be reduced. Therefore, it is possible to further reduce the power consumption of the target person terminal 10.

The position specifying system acquires, based on the position of the target person terminal 10 specified by the first specifying unit or the second specifying unit, the second time interval set according to an environment of a district including the position and sets the acquired second time interval to be used as the second time interval of the target person terminal 10. Consequently, the frequency of the position acquisition by the GPS function can be adjusted according to an environment of a district where the target person is located. Therefore, it is possible to confirm the position of the target person at an appropriate frequency and secure safety of the target person and peace of mind of the guardian while efficiently reducing the power consumption of the target person terminal 10.

The position specifying system acquires, based on the position of the target person terminal 10 specified by the first specifying unit or the second specifying unit and a time period, the second time interval set for a district including the position according to the time period and sets the acquired second time interval to be used as the second time interval of the target person terminal 10. Consequently, the frequency of the position acquisition by the GPS function can be adjusted according to a risk or the like at each time period of a district where the target person is located. Therefore, it is possible to confirm the position of the target person at an appropriate frequency and secure safety of the target person and peace of mind of the guardian while efficiently reducing the power consumption of the target person terminal 10.

When the position of the target person terminal 10 specified by the second specifying unit is outside the watching area, the position specifying system sets the second time interval of the target person terminal 10 to be changed to be short. Consequently, when the target person is present outside the watching area, the frequency of the position acquisition by the GPS function can be increased. Therefore, it is possible to incessantly and surely specify the position of the target person while reducing the power consumption of the target person terminal 10.

When the identification information transmitted from the first communication unit 13 of the target person terminal 10 is not acquired for a predetermined time, the position specifying system sets the second time interval of the target person terminal 10 corresponding to the identification information to be changed to be short. Consequently, when the identification information transmitted from the first communication unit 13 of the target person terminal 10 is not acquired, that is, when the target person terminal 10 is not detected in the watching area, the frequency of the position acquisition by the GPS function can be increased. Therefore, it is possible to incessantly and surely specify the position of the target person while suppressing the power consumption of the target person terminal 10.

The position specifying system sets, in the server 30, a setting flag for setting the second time interval to be changed. The target person terminal 10 is configured to acquire the setting flag when the target person terminal 10 communicates with the server 30 through the second communication unit 14 and change the second time interval based on content of the acquired setting flag. Consequently, it is possible to set a flag for changing the second time interval in the server 30 and change the second time interval when the target person terminal 10 acquires the flag at timing when the target person terminal 10 communicates with the server 30. Therefore, since it is unnecessary to actively perform communication from the server 30 and transmit setting information to the target person terminal 10, the target person terminal 10 does not need to wait for the communication from the server 30 and stay on standby. Consequently, it is possible to specify the position of the target person while further reducing the power consumption of the target person terminal 10.

When the second time interval is set to be changed to be short, the position specifying system notifies a guardian (the guardian terminal 40) of the target person. Consequently, when the target person moves out of the watching area or is about to move out of the watching area, it is possible to notify the guardian such as a family member of the target person and call attention.

The position specifying system outputs information concerning the position of the target person terminal 10 specified by the first specifying unit or the second specifying unit. Consequently, for example, by accessing the server 30 from the guardian terminal 40, it is possible to cause the guardian terminal 40 to display the position of the target person terminal 10. Therefore, the guardian such as a family member of the target person can confirm the position of the target person at any timing.

In the position specifying system, the terminal for detection 20a is provided in a predetermined position included in the watching area and transmits information for identifying the terminal for detection 20a to the server 30. The server 30 acquires, using the information for identifying the terminal for detection 20a transmitted from the terminal for detection 20a, from the storing unit 32 in which the information and the position of the terminal for detection 20a are stored in association with each other in advance, information concerning the position of the terminal for detection 20a. Consequently, it is possible to accurately specify the position of the target person terminal using the terminal for detection 20a, which is a fixed terminal provided in the watching area and storing the position information in advance.

In the position specifying system, the terminal for detection 20b is provided in a mobile body moving in a region including the watching area and acquires the information concerning the position of the terminal for detection 20 based on a signal from the GPS satellite and transmits the information to the server 30. The server 30 acquires the information concerning the position of the terminal for detection 20b based on the information transmitted from the terminal for detection 20b. Consequently, an information terminal such as a smartphone carried by a watching person moving within the watching area or a tablet PC provided in a moving taxi or the like can be used as the terminal for detection. Therefore, it is possible to accurately specify the position of the target person terminal 10 without providing fixed terminals across the watching area.

In the position specifying system, the target person terminal 10 is capable of operating even if the target person terminal 10 is not charged for approximately one month using a small secondary battery such as a rechargeable lithium ion battery. In the target person terminal 10 in this embodiment, a power consumption amount is remarkably reduced compared with a position specifying device that uses only the conventional GPS function as position specifying means and always uses the GPS function. Therefore, it is unnecessary to frequently perform charging. It is possible to suppress occurrence of a situation in which a position cannot be specified because of battery exhaustion of the target person terminal 10 in case of emergency. It is possible to solve the problems in the conventional position specifying device. Since the power consumption amount is small in the target person terminal 10 in this embodiment, the target person terminal 10 can generate a battery exhaustion alarm in good time, for example, one to two weeks before a battery exhaustion period. It is possible to solve the problems described above due to the battery exhaustion by replacing a battery when the guardian or the like confirms the alarm.

In the position specifying system, the target person terminal 10 is capable of receiving an instruction for notifying occurrence of an emergency situation. When the instruction is received, the target person terminal 10 transmits a notification indicating the occurrence of the emergency situation to the server 30 together with the identification information and the position information by the GPS function. Consequently, when some emergency situation occurs, for example, when the target person gets lost or is taken away, it is possible to receive an instruction for notifying to that effect. In doing so, it is possible to forcibly acquire the position information by the GPS function and notify the position information to the server 30. Consequently, the guardian or the like can immediately confirm the occurrence of the emergency situation and whereabouts of the target person at that time and can quickly take measures such as a rescue or a search for the target person. Since the transition of the position of the target person can be confirmed later, for example, when the target person is missing, it is possible to narrow down a search range and more effectively perform a search. Whereas ranges reachable by the target person are exhaustively searched and videos of security cameras and the like provided in the ranges are checked one by one in the past, since positions of the target person can be narrowed down to a certain degree, it is possible to greatly reduce work necessary for the search and perform quick search activities.

When the target person terminal 10 receives the instruction for notifying the occurrence of the emergency situation, the target person terminal 10 records voice or an image around the target person terminal 10 and transmits information indicating the recorded voice or image to the server 30 via the second communication unit 14. Therefore, when an emergency situation occurs in the target person, it is possible to automatically record voice or an image around the target person terminal 10 and transmit the voice or the image to the server 30. Consequently, the guardian or the like can grasp, more in detail, a surrounding situation at the time when the emergency situation occurs in the target person, leading to a quick and appropriate response.

In the position specifying system, the server 30 is capable of setting an emergency flag indicating the occurrence of the emergency situation. When the target person terminal 10 communicates with the server 30 through the second communication unit 14 and acquires the emergency flag from the server 30, the target person terminal 10 receives an instruction for notifying the occurrence of the emergency situation. Therefore, when it is assumed that an emergency situation occurs in the target person, even if there is no instruction by the target person, it is possible to cause the target person terminal 10 to transmit position information or transmit voice and an image around the target person terminal 10. Consequently, it is possible to more surely grasp a surrounding situation at the time when the emergency situation occurs in the target person, leading to a quick and appropriate response.

In the position specifying system, the target person terminal 10 includes a sensor for detecting movement thereof and stores the second time interval at a moving time used when the target person terminal 10 is moving and the second time interval at a standstill time used when the target person terminal 10 is standing still. When it is determined based on a detection result of the sensor that the target person terminal 10 is moving, the second communication unit of the target person terminal 10 transmits the identification information and the position information to the server 30 at the second time interval at the moving time. On the other hand, when it is determined that the target person terminal 10 is standing still, the second communication unit of the target person terminal 10 transmits the identification information and the position information to the server 30 at the second time interval at the standstill time. Consequently, it is possible to more efficiently perform the position information acquisition and the long-range wireless communication by the GPS function according to necessity considering a moving state of the target person terminal 10. It is possible to optimize a balance between a reduction of a power consumption amount and certainty of position specifying.

In the position specifying system, the target person terminal 10 includes a sensor for detecting movement thereof and stores, for each of stages of moving speed thereof, the second time interval corresponding to each stage. The second communication unit of the target person terminal 10 transmits, according to a stage of the moving speed of the target person terminal 10, the identification information and the position information to the server 30 at the second time interval corresponding to the stage. Consequently, it is possible to more efficiently perform the position information acquisition and the long-range wireless communication by the GPS function according to necessity considering moving speed of the target person terminal 10. It is possible to optimize a balance between a reduction of a power consumption amount and certainty of position specifying.

In the position specifying system, the target person terminal 10 includes a sensor for detecting movement thereof. When it is determined based on a detection result of the sensor that the target person terminal 10 is standing still, the second communication unit 14 of the target person terminal 10 does not perform acquisition of position information based on a signal from the GPS satellite and transmits, to the server 30, the position information transmitted last time. Consequently, it is possible to more efficiently perform the position information acquisition and the long-range wireless communication by the GPS function according to necessity considering a moving state of the target person terminal 10. It is possible to optimize a balance between a reduction of a power consumption amount and certainty of position specifying.

The present application is based on the Japanese patent application No. 2019-158510 filed on Aug. 30, 2019. The disclosed contents thereof are referred to and incorporated here as a whole.

REFERENCE SIGNS LIST

10: target person terminal
11: control unit
12: storing unit
13: first communication unit
14: second communication unit
15: receiving unit
16: acquiring unit
20, 20a, 20b: terminal for detection
21: control unit
22: storing unit
23: communication unit
24: detecting unit
30: server
31: control unit
32: storing unit
33: communication unit
40: guardian terminal
41: control unit
42: storing unit
43: communication unit
44: display unit
45: operation receiving unit FIG. 1
30 SERVER
1 WITHIN AREA
2 SHORT-RANGE WIRELESS COMMUNICATION (BLE COMMUNICATION)
3 OUTSIDE AREA
4 LONG-RANGE WIRELESS COMMUNICATION (LTE-M COMMUNICATION)
FIG. 2
11 CONTROL UNIT
12 STORING UNIT
13 FIRST COMMUNICATION UNIT
14 SECOND COMMUNICATION UNIT
15 RECEIVING UNIT
16 ACQUIRING UNIT
FIG. 3
21 CONTROL UNIT
22 STORING UNIT
23 COMMUNICATION UNIT
24 DETECTING UNIT
FIG. 4
31 CONTROL UNIT
32 STORING UNIT
33 COMMUNICATION UNIT
FIG. 5
41 CONTROL UNIT
42 STORING UNIT
43 COMMUNICATION UNIT
44 DISPLAY UNIT
45 OPERATION RECEIVING UNIT
FIG. 6
10 TARGET PERSON TERMINAL
20 TERMINAL FOR DETECTION
30 SERVER
S101 HAS FIRST TIME INTERVAL ELAPSED?
S102 TRANSMIT IDENTIFICATION INFORMATION
1 IDENTIFICATION INFORMATION
S103 HAS SECOND TIME INTERVAL ELAPSED?
S104 ACQUIRE GPS POSITION INFORMATION
S105 TRANSMIT IDENTIFICATION INFORMATION AND POSITION INFORMATION
2 IDENTIFICATION INFORMATION AND POSITION INFORMATION
S106 ACQUIRE AND REFLECT FLAG INFORMATION
S201 IS IDENTIFICATION INFORMATION ACQUIRED?
S202 TRANSMIT IDENTIFICATION INFORMATION
3 IDENTIFICATION INFORMATION (POSITION INFORMATION)
S301 SPECIFY AND REGISTER POSITION
S302 SHOULD USE FREQUENCY OF GPS BE CHANGED?
S303 NOTIFY AND SET FLAG
S304 SPECIFY AND REGISTER POSITION
S305 SHOULD USE FREQUENCY OF GPS BE CHANGED?
S306 NOTIFY AND SET AND TRANSMIT FLAG
4 FLAG INFORMATION
S307 OUTPUT
FIG. 7
(a)
1 NOTIFICATION
2 MR. A MOVES OUT OF AREA
3 DO YOU CHECK POSITION INFORMATION?
4 YES
5 CANCEL (b)
1 POSITION INFORMATION DISPLAY
2 MR. A
3 MINAMI WARD
4 CHUO WARD
(c)
1 POSITION INFORMATION DISPLAY
2 MR. A
3 MINAMI WARD

The invention claimed is:

1. A position specifying system comprising:
a target person terminal carried by a target person;
a terminal for detection that is present in a region including a watching area that is preset for the target person and detects the target person terminal communicable via short-range wireless communication; and
a server that registers information transmitted from the target person terminal and the terminal for detection, wherein
the target person terminal includes:
   a first communication unit that outputs, at a pre-set first time interval, a signal for performing the short-range wireless communication and transmits, via the short-range wireless communication, identification information for identifying the target person terminal; and
   a second communication unit that acquires, at a pre-set second time interval, position information of the target person terminal based on a signal from a GPS satellite and transmits the identification information and the position information to the server,
the terminal for detection includes:
   a detecting unit that detects the communicable target person terminal; and
   a transmitting unit that, when the target person terminal is detected by the detecting unit, acquires the identification information transmitted from the first communication unit and transmits the identification information to the server, and the server includes:
   an acquiring unit that acquires the identification information transmitted from the terminal for detection and information concerning a position of the terminal for detection;
   a first specifying unit that specifies a position of the target person terminal based on the identification information and the information concerning the position of the terminal for detection acquired by the acquiring unit; and
   a second specifying unit that specifies the position of the target person terminal based on the identification information and the position information transmitted from the second communication unit of the target person terminal.

2. The position specifying system according to claim 1, further comprising
   a setting unit that sets, based on a specifying state of the position of the target person terminal in the first specifying unit or the second specifying unit, the second time interval of the target person terminal to be changed.

3. The position specifying system according to claim 2, wherein
   when the position of the target person terminal specified by the first specifying unit or the second specifying unit is included in a predetermined range within the watching area, the setting unit sets the second time interval of the target person terminal to be changed to be short.

4. The position specifying system according to claim 2, wherein
   when it is determined based on the position of the target person terminal specified by the first specifying unit that the target person terminal is moving from a predetermined range within the watching area toward an outer side of the watching area, the setting unit sets the second time interval of the target person terminal to be changed to be short.

5. The position specifying system according to claim 2, wherein
   when the position of the target person terminal specified by the first specifying unit or the second specifying unit has moved from a predetermined range within the watching area to a range other than the predetermined range within the watching area, the setting unit sets the second time interval of the target person terminal to be changed to be long.

6. The position specifying system according to claim 2, wherein
   the setting unit receives, for at least one district within the watching area, setting of the second time interval corresponding to an environment of the district, acquires, based on the position of the target person terminal specified by the first specifying unit or the second specifying unit, the second time interval being pre-set according to an environment of a district including the position, and sets the acquired second time interval to be used as the second time interval of the target person terminal.

7. The position specifying system according to claim 2, wherein
   the setting unit receives, for at least one district within the watching area, setting of the second time interval corresponding to a time period, acquires, based on the position of the target person terminal specified by the first specifying unit or the second specifying unit and the time period, the second time interval being pre-set for a district including the position according to the time period, and sets the acquired second time interval to be used as the second time interval of the target person terminal.

8. The position specifying system according to claim 2, wherein
   when the position of the target person terminal specified by the second specifying unit is outside the watching area, the setting unit sets the second time interval of the target person terminal to be changed to be short.

9. The position specifying system according to claim 2, wherein, when the identification information transmitted from the first communication unit of the target person terminal is not acquired for a predetermined time, the setting unit sets the second time interval of the target person terminal corresponding to the identification information to be changed to be short.

10. The position specifying system according to claim 2, wherein
    the setting unit sets, in the server, a setting flag for setting the second time interval to be changed, and
    the target person terminal acquires the setting flag when the target person terminal communicates with the server through the second communication unit and changes the second time interval based on content of the acquired setting flag.

11. The position specifying system according to claim 2, further comprising a notifying unit that, when the second time interval is pre-set to be changed to be short by the setting unit, notifies a guardian of the target person.

12. The position specifying system according to claim 1, further comprising
an output unit that outputs information concerning the position of the target person terminal specified by the first specifying unit or the second specifying unit.

13. The position specifying system according to claim 1, wherein
the terminal for detection is provided in a predetermined position included in the watching area,
the transmitting unit transmits information for identifying the terminal for detection, and
the acquiring unit acquires, using the information for identifying the terminal for detection transmitted from the terminal for detection, from a storing unit in which the information and the position of the terminal for detection are stored in association with each other in advance, information concerning the position of the terminal for detection.

14. The position specifying system according to claim 1, wherein
the terminal for detection is provided in a mobile body moving in a region including the watching area,
the transmitting unit acquires the information concerning the position of the terminal for detection based on a signal from the GPS satellite and transmits the information to the server, and
the acquiring unit acquires the information concerning the position of the terminal for detection based on the information transmitted from the terminal for detection.

15. The position specifying system according to claim 1, wherein
the target person terminal further includes a receiving unit that receives an instruction for notifying occurrence of an emergency situation, and
when the instruction is received by the receiving unit, the second communication unit transmits a notification indicating the occurrence of the emergency situation to the server together with the identification information and the position information.

16. The position specifying system according to claim 15, wherein
the target person terminal further includes a recording unit that records voice or an image around the target person terminal when the instruction is received by the receiving unit, and
when the instruction is received by the receiving unit, the second communication unit transmits information indicating the voice or the image recorded by the recording unit to the server.

17. The position specifying system according to claim 15, wherein
the server is capable of setting an emergency flag indicating the occurrence of the emergency situation, and
when the receiving unit communicates with the server through the second communication unit and acquires the emergency flag from the server, the receiving unit receives the instruction.

18. The position specifying system according to claim 1, wherein
the target person terminal further includes a sensor for detecting movement of the target person terminal and stores the second time interval at a moving time used when the target person terminal is moving and the second time interval at a standstill time used when the target person terminal is standing still, and
when it is determined based on a detection result of the sensor that the target person terminal is moving, the second communication unit transmits the identification information and the position information to the server at the second time interval at the moving time, and
when it is determined that the target person terminal is standing still, the second communication unit transmits the identification information and the position information to the server at the second time interval at the standstill time.

19. The position specifying system according to claim 1, wherein
the target person terminal further includes a sensor for detecting movement of the target person terminal and stores, for each of stages of moving speed of the target person terminal, the second time interval corresponding to each stage, and
the second communication unit transmits, according to a stage of the moving speed of the target person terminal, the identification information and the position information to the server at the second time interval corresponding to the stage.

20. The position specifying system according to claim 1, wherein
the target person terminal further includes a sensor for detecting movement of the target person terminal, and
when it is determined based on a detection result of the sensor that the target person terminal is standing still, the second communication unit does not perform acquisition of position information of the target person terminal based on a signal from the GPS satellite and transmits, to the server, the position information transmitted last time.

21. A position specifying method executed in a system including a target person terminal carried by a target person, a terminal for detection that is present in a region including a preset watching area for the target person and detects the target person terminal communicable via short-range wireless communication, and a server that registers information transmitted from the target person terminal and the terminal for detection, the position specifying method comprising:
a procedure (a) for, by the target person terminal, outputting, at a pre-set first time interval, a signal for performing the short-range wireless communication and transmitting, via the short-range wireless communication, identification information for identifying the target person terminal;
a procedure (b) for, by the target person terminal, acquiring, at a pre-set second time interval, position information of the target person terminal based on a signal from a GPS satellite and transmitting the identification information and the position information to the server;
a procedure (c) for, by the terminal for detection, detecting the communicable target person terminal;
a procedure (d) for, when the target person terminal is detected in the procedure (c), by the terminal for detection, acquiring the identification information transmitted in the procedure (a) and transmitting the identification information to the server;
a procedure (e) for, by the server, acquiring the identification information transmitted from the terminal for detection and information concerning a position of the terminal for detection;
a procedure (f) for, by the server, specifying a position of the target person terminal based on the identification information and the information concerning the position of the terminal for detection acquired in the procedure (e); and a procedure (g) for specifying the position of the target person terminal based on the identification information and the position information transmitted from the target person terminal.

22. The position specifying system according to claim 1, wherein the position specifying system is configured such that the pre-set second time interval is longer than the pre-set first time interval.

23. The position specifying system according to claim 1, wherein the position specifying system is configured to transmit the identification information and the position information to the server via long-range wireless communication longer in a communication distance than the short-range wireless communication.

24. The position specifying method according to claim 21, wherein the pre-set second time interval is longer than the pre-set first time interval.

25. The position specifying method according to claim 21, wherein transmitting the identification information and the position information to the server is accomplished via long-range wireless communication longer in a communication distance than the short-range wireless communication.

* * * * *